United States Patent
Iisaka

(10) Patent No.: US 9,917,470 B2
(45) Date of Patent: Mar. 13, 2018

(54) IN-VEHICLE CHARGING APPARATUS

(71) Applicant: PANASONIC INTELLECTUAL PROPERTY MANAGEMENT CO., LTD., Osaka (JP)

(72) Inventor: Atsushi Iisaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 14/778,377

(22) PCT Filed: Mar. 7, 2014

(86) PCT No.: PCT/JP2014/001266
§ 371 (c)(1),
(2) Date: Sep. 18, 2015

(87) PCT Pub. No.: WO2014/147986
PCT Pub. Date: Sep. 25, 2014

(65) Prior Publication Data
US 2016/0172897 A1  Jun. 16, 2016

(30) Foreign Application Priority Data
Mar. 22, 2013 (JP) ................. 2013-059795

(51) Int. Cl.
*H02J 7/00* (2006.01)
*H02J 7/14* (2006.01)
(Continued)

(52) U.S. Cl.
CPC .............. *H02J 7/1469* (2013.01); *B60L 3/00* (2013.01); *B60L 11/1818* (2013.01);
(Continued)

(58) Field of Classification Search
CPC ... H02J 7/1469; H01M 10/44; B60L 11/1809; B60L 11/1811; B60L 11/1812; B60L 11/1816; B60L 11/1818
(Continued)

(56) References Cited

U.S. PATENT DOCUMENTS 9,627,902 B2 * 4/2017 Kamishima ........... H02J 7/0052
2010/0241299 A1 * 9/2010 Ito ....................... B60L 11/1818
701/22
(Continued)

FOREIGN PATENT DOCUMENTS

EP  2113410 A1  11/2009
JP  11-178228 A  7/1999
(Continued)

OTHER PUBLICATIONS

International Search Report for Application No. PCT/JP2014/001266 dated Apr. 1, 2014.
(Continued)

*Primary Examiner* — Drew A Dunn
*Assistant Examiner* — Michael Dibenedetto
(74) *Attorney, Agent, or Firm* — Pearne & Gordon LLP

(57) ABSTRACT

An in-vehicle charging apparatus (100) has: a charge control ECU (10), which operates with power supplied from a low-voltage battery (16), and which controls charging; an S2 switch, which is on/off controlled by means of the charge control ECU (10), and which reduces a voltage of the pulse signals when the switch is in the on-state; and a switch (SW1), which is controlled to be in an on-state by means of units other than the charge control ECU (10), and which reduces the voltage of the pulse signals when the switch is in the on-state. In the cases where the switch (SW1) is turned on, power from a charging cable (200) is supplied to the low-voltage battery (16) or the charge control ECU (10).

8 Claims, 6 Drawing Sheets

(51) Int. Cl.
*H01M 10/44* (2006.01)
*B60L 3/00* (2006.01)
*B60L 11/18* (2006.01)

(52) U.S. Cl.
CPC ....... *B60L 11/1824* (2013.01); *B60L 11/1838* (2013.01); *B60L 11/1859* (2013.01); *B60L 11/1868* (2013.01); *H01M 10/44* (2013.01); *B60L 2210/10* (2013.01); *B60L 2210/30* (2013.01); *B60L 2230/12* (2013.01); *B60L 2250/16* (2013.01); *H02J 2007/0095* (2013.01); *Y02T 10/7005* (2013.01); *Y02T 10/7066* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
USPC .......................................... 320/104, 140, 141
See application file for complete search history.

(56) References Cited

U.S. PATENT DOCUMENTS

| | | | | |
|---|---|---|---|---|
| 2012/0074900 | A1* | 3/2012 | Takikita | B60L 11/1811 320/109 |
| 2012/0091957 | A1* | 4/2012 | Masuda | H01R 13/7035 320/109 |
| 2012/0139489 | A1* | 6/2012 | Gaul | B60L 11/1816 320/109 |
| 2012/0223575 | A1 | 9/2012 | Hachiya et al. | |
| 2013/0279056 | A1 | 10/2013 | Ohnuki | |
| 2013/0307489 | A1* | 11/2013 | Kusch | B60L 11/1868 320/162 |
| 2013/0314034 | A1* | 11/2013 | Ang | B60W 20/00 320/107 |
| 2013/0342166 | A1 | 12/2013 | Takikita et al. | |
| 2014/0091750 | A1 | 4/2014 | Ikeda | |
| 2014/0091764 | A1* | 4/2014 | Kinomura | B60L 11/1818 320/109 |

FOREIGN PATENT DOCUMENTS

| | | |
|---|---|---|
| JP | 2009-106011 A | 5/2009 |
| JP | 2010-141956 A | 6/2010 |
| JP | 2010-148213 A | 7/2010 |
| JP | 2010-193670 A | 9/2010 |
| JP | 2012-164438 A | 8/2012 |
| JP | 2012-182894 A | 9/2012 |
| WO | 2012/164798 A1 | 12/2012 |
| WO | 2013011596 A1 | 1/2013 |
| WO | 2013/038898 A1 | 3/2013 |

OTHER PUBLICATIONS

Extended European Search Report dated Jun. 24, 2016 for European Application No. 14768771.9.

* cited by examiner

| STATE OF AUXILIARY CHARGING SWITCH | OFF | ON |
|---|---|---|
| SW1 | OFF | ON |
| SW2 | OFF | ON |
| SW3 | ON | OFF |
| SW4 | OFF | ON |

FIG. 2

IN-VEHICLE CHARGING APPARATUS

TECHNICAL FIELD

The present invention relates to an in-vehicle charging apparatus that charges two batteries mounted in a vehicle with use of an external power source through a charging cable.

BACKGROUND ART

In recent years, plug-in hybrid electric vehicles (PHEVs) and electric vehicles (EVs) are commonly used. In such vehicles, a high voltage battery, a low voltage battery, and an in-vehicle charging apparatus are mounted. The high voltage battery is a power source for driving a motor and the like of the vehicle, and the low voltage battery is a power source for operating an engine control unit (ECU) of the in-vehicle charging apparatus. The in-vehicle charging apparatus is connected with the external power source (hereinafter referred to as "external power source"), and controls charging of the high voltage battery and the low voltage battery from the external power source.

In such a configuration, in a case where the remaining capacity of the low voltage battery is insufficient (in a case of battery exhaustion), the operation of the ECU is stopped, and as a result charging of the batteries cannot be performed. In view of this, for example, PTL 1 discloses a technique in which charging from an external power source to an ECU is performed with use of a path other than a path connected to a high voltage battery and a path connected to a low voltage battery. In this manner, with the technique disclosed in PTL 1, even when the remaining capacity of the low voltage battery is insufficient, the ECU can operate, and therefore charging of batteries can be performed.

CITATION LIST

Patent Literature

PTL 1
WO2012/164798

SUMMARY OF INVENTION

Technical Problem

Although the technique disclosed in PTL 1 is designed for a configuration in which the external power source and the in-vehicle charging apparatus are directly connected together to perform charging, the technique is not designed for a configuration in which the external power source and the in-vehicle charging apparatus are connected together through a charging cable (EVSE: Electric Vehicle Service Equipment) to perform charging.

After being fitted with the external power source and the in-vehicle charging apparatus, the charging cable sends a pulse signal of a predetermined voltage to the in-vehicle charging apparatus, and, when the voltage of the pulse signal is reduced by the in-vehicle charging apparatus, the charging cable starts supply of power from the external power source to the in-vehicle charging apparatus. An example of such a charging cable is a charging cable of SAE J1772 standard.

The technique disclosed in PTL 1 cannot solve a problem that charging cannot be performed when the operation of an ECU is stopped because of insufficient remaining capacity of a low voltage battery in an in-vehicle charging apparatus that performs charging using the above-described charging cable.

An object of the present invention is to provide an in-vehicle charging apparatus that charges a high voltage battery and a low voltage battery with use of a charging cable configured to start supply of power to the in-vehicle charging apparatus based on dropping of a voltage of a pulse signal preliminarily sent to the in-vehicle charging apparatus, and that can charge batteries even when the remaining capacity of the low voltage battery is insufficient.

Solution to Problem

An in-vehicle charging apparatus of an embodiment of the present invention charges a high voltage battery and a low voltage battery with use of a charging cable configured to start supply of power to the in-vehicle charging apparatus based on a state of a voltage of a pulse signal preliminarily sent to the in-vehicle charging apparatus, the in-vehicle charging apparatus including: a charging control section that operates with power supplied from the low voltage battery, and controls the charging; a voltage drop switch whose on/off is controlled by the charging control section, the voltage drop switch being configured to reduce the voltage of the pulse signal when the voltage drop switch is in an on state; and a first switch that is turned on by a component other than the charging control section and reduces the voltage of the pulse signal when the first switch is in an on state, in which the power from the charging cable is supplied to the low voltage battery or the charging control section when the first switch is turned on.

Advantageous Effects of Invention

According to the present invention, in an in-vehicle charging apparatus that charges a high voltage battery and a low voltage battery with use of a charging cable configured to start supply of power to the in-vehicle charging apparatus based on dropping of a voltage of a pulse signal preliminarily sent to the in-vehicle charging apparatus, batteries can be charged even when the remaining capacity of the low voltage battery is insufficient.

BRIEF DESCRIPTION OF DRAWINGS

FIG. 2 is a table showing a relationship between on/off of switches and an auxiliary charging switch of the in-vehicle charging apparatus according to the embodiment of the present invention;

DESCRIPTION OF EMBODIMENTS

Embodiment

In the following, an in-vehicle charging apparatus according to an embodiment of the present invention will be described with reference to the accompanying drawings.

<Configuration of In-Vehicle Charging Apparatus 100>

Figure 1:
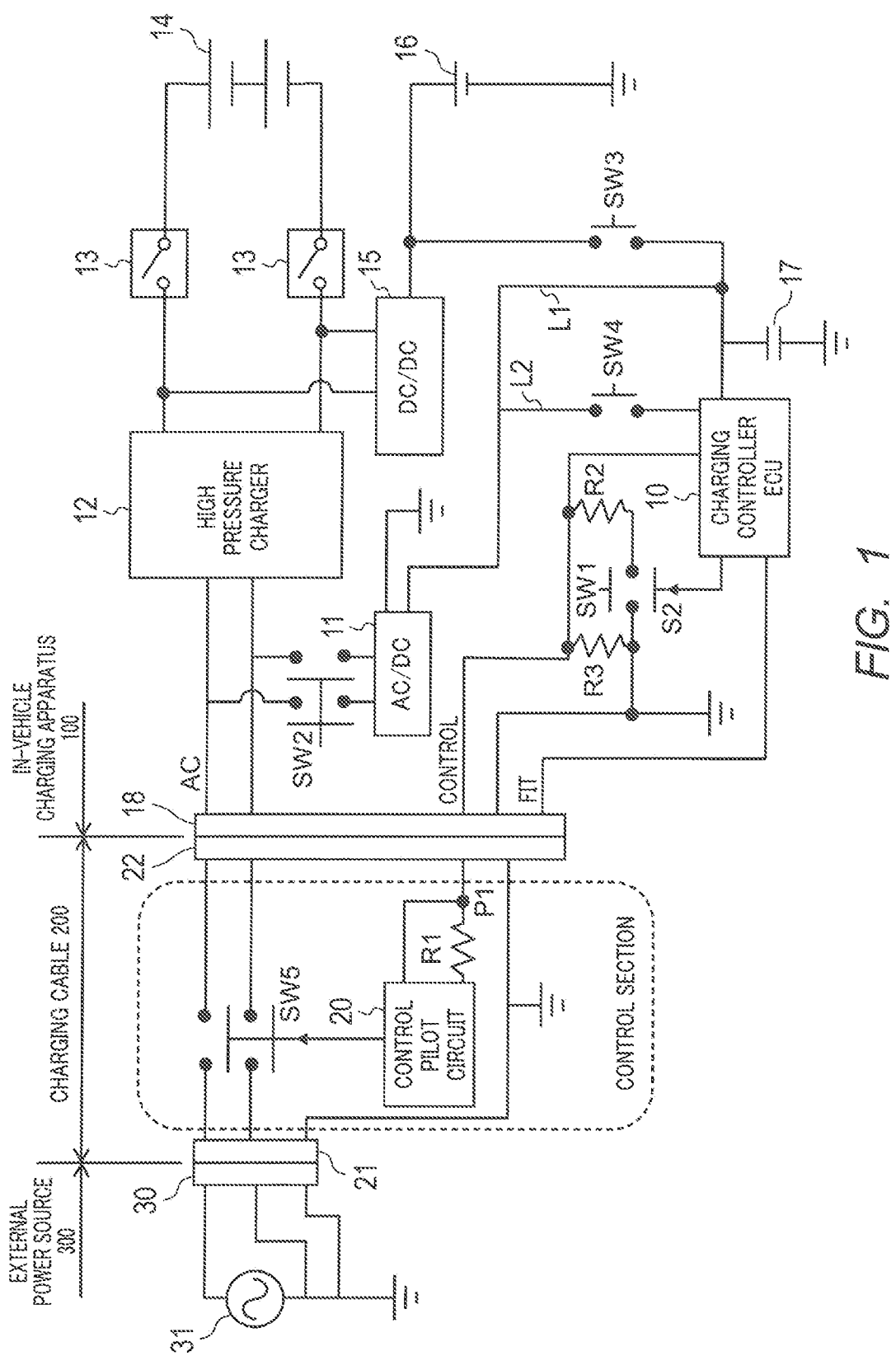
FIG. 1 illustrates an exemplary configuration of an in-vehicle charging apparatus according to an embodiment of the present invention.

First, a configuration of in-vehicle charging apparatus 100 of the present embodiment is described with reference to FIG. 1. FIG. 1 illustrates an exemplary configuration of in-vehicle charging apparatus 100 according to the present embodiment.

In FIG. 1, in-vehicle charging apparatus 100 and external power source 300 are connected together through charging cable 200. In-vehicle charging apparatus 100 and charging cable 200 are connected together when connecting part 18 of in-vehicle charging apparatus 100 and connecting part 22 of charging cable 200 are fitted to each other (details are described later). In addition, charging cable 200 and external power source 300 are connected together when connecting part 21 of charging cable 200 and connecting part 30 of external power source 300 are fitted to each other.

Charging cable 200 is an EVSE of SAE J1772 standard for example. In FIG. 1, charging cable 200 includes a control section, control pilot circuit 20 and switch SW5 in addition to the above-described connecting parts 21 and 22. When an AC power is supplied to charging cable 200 from power system 31 of external power source 300, control pilot circuit 20 outputs a 12V-control pulse signal (an example of pulse signal) to in-vehicle charging apparatus 100. Here, before in-vehicle charging apparatus 100 is connected to the cable, the voltage of a control pulse signal at P1 section is 12 V, and after in-vehicle charging apparatus 100 is connected to the cable, the voltage of a control pulse signal at P1 section is 9 V. When in-vehicle charging apparatus 100 reduces the voltage of the control pulse signal to 6 V, control pilot circuit 20 detects the voltage at P1 section, and turns on switch SW5 (in the drawing, switch SW5 is in an off state). In this manner, the AC power from external power source 300 is supplied to in-vehicle charging apparatus 100 through charging cable 200.

In-vehicle charging apparatus 100 includes charging controller ECU10, AC/DC 11, high pressure charger 12, main relay 13, high voltage battery 14, DC/DC 15, low voltage battery 16, backup capacitor 17, and connecting part 18. While, for convenience of description, FIG. 1 illustrates an exemplary case where high voltage battery 14 and low voltage battery 16 are included in in-vehicle charging apparatus 100, these batteries may not be included in in-vehicle charging apparatus 100.

In addition, in-vehicle charging apparatus 100 includes S2 switch, switch SW1, switch SW2, switch SW3, and switch SW4. The switches except for S2 switch, switches SW1 to SW4, are a feature of the present embodiment. It is to be noted that, in FIG. 1, all of the above-mentioned switches are in an off state.

Charging controller ECU10 (an example of a charging control section) controls the above-described components, and controls charging in in-vehicle charging apparatus 100. Charging controller ECU10 normally operates with power supplied from low voltage battery 16, but operates with power supplied from AC/DC 11 when the remaining capacity of low voltage battery 16 is insufficient. Charging controller ECU10 is connected with charging cable 200, and turns on S2 switch to reduce the voltage at P1 section to 6 V upon reception of a control pulse signal whose voltage at P1 section is 9 V from charging cable 200.

AC/DC 11 (an example of an AC/DC conversion section) converts an AC power supplied from charging cable 200 through switch SW2 into a DC power. The power from AC/DC 11 is supplied to charging controller ECU10.

High pressure charger 12 converts an AC power from charging cable 200 into a DC power, and outputs the DC power to high voltage battery 14 and DC/DC 15.

Main relay 13 is provided between high pressure charger 12 and high voltage battery 14, and turned on/off under the control of charging controller ECU10. When main relay 13 is in an on state, the DC power from high pressure charger 12 is supplied to high voltage battery 14.

High voltage battery 14 is a battery for driving a motor of a vehicle and the like.

DC/DC 15 changes the value of the voltage of the DC power from high pressure charger 12, and supplies the DC power to low voltage battery 16.

Low voltage battery 16 is a battery for operating charging controller ECU10 and the like.

When the voltage of the power supply line is dropped by the switching operation of SW2 and SW3 and power supply to charging controller ECU10 is stagnated, backup capacitor 17 makes up for the insufficient power to maintain the voltage of the power supply line.

S2 switch (an example of a voltage drop switch) is on/off controlled by charging controller ECU10. As described above, when S2 switch is turned on, the voltage of the control pulse signal at P1 section is reduced from 9 V to 6 V.

Switch SW1 (an example of a first switch) operates as substitute for S2 switch when the remaining capacity of low voltage battery 16 is insufficient and the operation of charging controller ECU10 is stopped. That is, when switch SW1 is turned on, the voltage of the control pulse signal at P1 section is reduced from 9 V to 6 V.

Switch SW1 is connected with an auxiliary charging switch (details are described later), and interlocked with the on/off of the auxiliary charging switch. That is, switch SW1 is in an off state when the auxiliary charging switch is in an off state, and is in an on state when the auxiliary charging is in an on state.

Switch SW2 (an example of a second switch) is a switch for turning on or off the power supply line between connecting part 18 and AC/DC 11. That is, when switch SW2 is turned on, the AC power from charging cable 200 is supplied to AC/DC 11, and the DC power is output from AC/DC 11. This DC power is supplied to charging controller ECU10. Thus, when the remaining capacity of low voltage battery 16 is insufficient and the operation of charging controller ECU10 is stopped, switch SW2 is turned on so as to supply power to charging controller ECU10. In this manner, charging controller ECU10 is allowed to operate.

Switch SW2 is connected with the auxiliary charging switch, and interlocked with the on/off of the auxiliary charging switch. That is, switch SW2 is in an off state when the auxiliary charging switch is in an off state, and is in an on state when the auxiliary charging switch is in an on state.

Switch SW3 (an example of a third switch) is a switch for turning on or off the power supply line between low voltage battery 16 and charging controller ECU10. That is, when switch SW3 is turned on, the power is supplied from low voltage battery 16 to charging controller ECU10. On the other hand, when switch SW3 is turned off, the DC power from AC/DC 11 is not output to low voltage battery 16. Consequently, when the remaining capacity of low voltage battery 16 is not insufficient and charging controller ECU10 is in operation, switch SW3 is turned on, and power is supplied from low voltage battery 16 to charging controller ECU10. In this manner, charging controller ECU10 is allowed to operate. On the other hand, when the remaining capacity of low voltage battery 16 is insufficient and the operation of charging controller ECU10 is stopped, switch SW3 is turned off, and the DC power from AC/DC 11 is not supplied to low voltage battery 16 and surely supplied to charging controller ECU10. In this manner, charging controller ECU10 is allowed to operate.

Switch SW3 is connected with the auxiliary charging switch, and interlocked with the on/off of the auxiliary charging switch. That is, switch SW3 is in an on state when the auxiliary charging switch is in an off state, and is in an off state when the auxiliary charging switch is in an on state.

Switch SW4 is a switch for turning on or off signal transmission line L2 from AC/DC 11 to charging controller ECU10. AC/DC 11 and charging controller ECU10 are connected together with the lines L1 and L2 which are in parallel to each other. Power supply line L1 is connected with the power supply line between low voltage battery 16 and charging controller ECU10. By another port, signal transmission line L2 is directly connected with charging controller ECU10. The power from AC/DC 11 is supplied to charging controller ECU10 via power supply line L1; however, only with such a configuration, charging controller ECU10 cannot determine whether the power is supplied from low voltage battery 16 or from AC/DC 11. In view of this, a configuration is adopted in which the output of AC/DC 11 is supplied to charging controller ECU10 not only via power supply line L1, but also via signal transmission line L2. In this manner, charging controller ECU10 can determine whether the power is supplied from AC/DC 11 or low voltage battery 16. That is, when switch SW4 is turned on, the output voltage of AC/DC 11 is transmitted to charging controller ECU10 through signal transmission line L2. At this time, charging controller ECU10 can recognize supply of power from AC/DC 11. Thus, charging controller ECU10 can recognize that the operation mode is an auxiliary charging mode (details are described later) when switch SW4 is in an on state and the signal voltage of signal transmission line L2 is equal to or greater than a predetermined threshold (for example, 6 V). On the other hand, charging controller ECU10 can recognize that the operation mode is a normal charging mode (details are described later) when switch SW4 is in an off state and signal transmission line L2 has no signal voltage.

Switch SW4 is connected with the auxiliary charging switch, and interlocked with the on/off of the auxiliary charging switch. That is, switch SW4 is in an on state when the auxiliary charging switch is in an on state, and is in an off state when the auxiliary charging switch is in an off state.

As described, switches SW1 to SW4 are connected with the auxiliary charging switch, and interlocked with the on/off of the auxiliary charging switch. FIG. 2 illustrates the relationship between on/off of the auxiliary charging switch and switches SW1 to SW4. As illustrated in FIG. 2, when the auxiliary charging switch is in an off state, switches SW1, SW2, and SW4 are in an off state, and switch SW3 is in an on state. On the other hand, when the auxiliary charging switch is in an on state, switch SW1, SW2, and SW4 are in an on state, and switch SW3 is in an off state. In other words, the auxiliary charging switch is a switch that can simultaneously control the on/off of switches SW1 to SW4.

<Configurations of Connecting Part 18 and Connecting Part 22>

Figure 3:
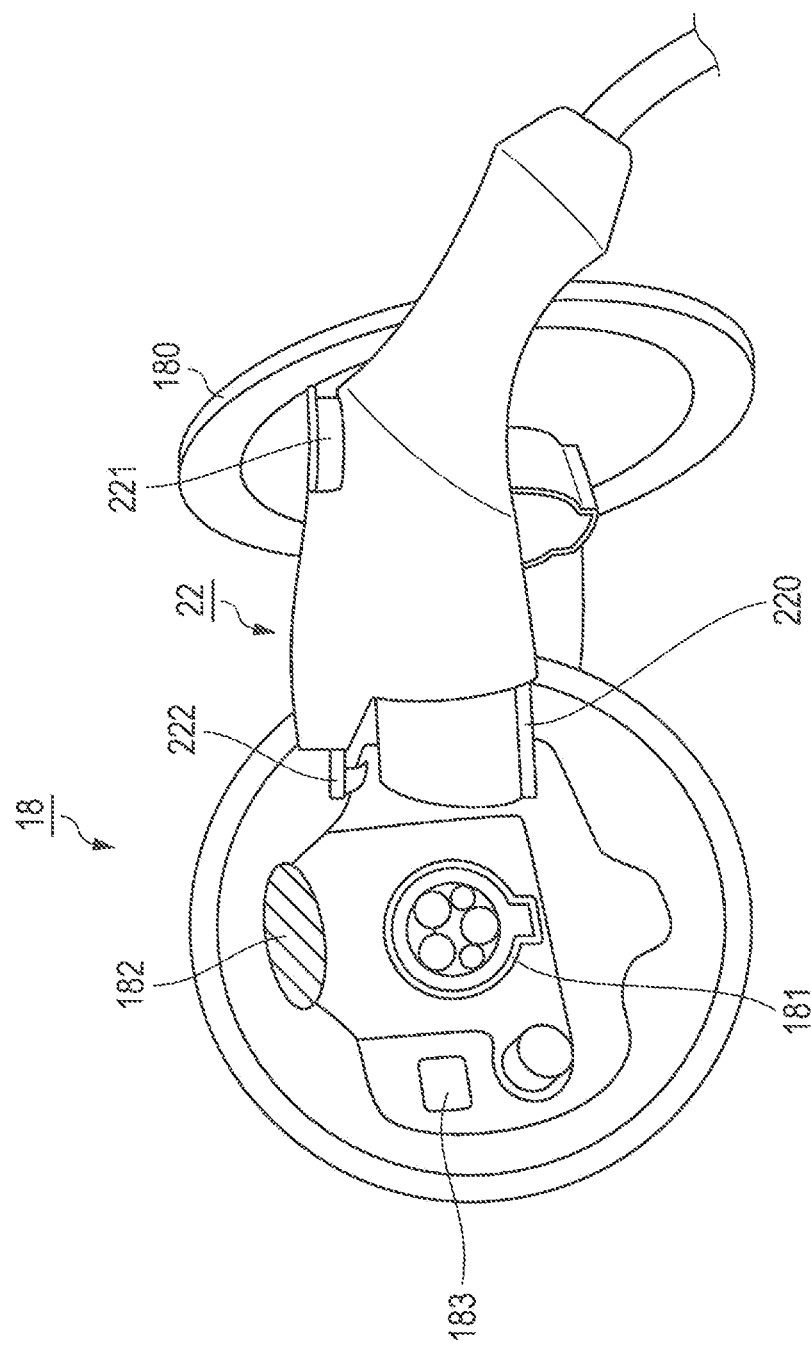
FIG. 3 illustrates exemplary connecting parts of the in-vehicle charging apparatus and a charging cable according to the embodiment of the present invention.

Next, the configurations of connecting part 18 of in-vehicle charging apparatus 100 and connecting part 22 of charging cable 200 of the present embodiment are described with reference to FIG. 3. FIG. 3 illustrates exemplary configurations of connecting part 18 and connecting part 22 according to the present embodiment.

In FIG. 3, connecting part 22 includes plug 220, unlock button 221, and switch-off button 222. In addition, in FIG. 3, connecting part 18 includes cap 180, port 181, auxiliary charging switch 182, and LED indicator 183.

The user opens cap 180, and inserts plug 220 into port 181. In this manner, plug 220 and port 181 are locked. At a position next to port 181, LED indicator 183 is provided. LED indicator 183 indicates a charging state (details are described later). On the upper side of port 181, auxiliary charging switch 182 is provided. The position of auxiliary charging switch 182 is not limited to the upper side of port 181, but it is preferable to dispose auxiliary charging switch 182 at a position near port 181 so as to facilitate the charging operation of the user.

The user presses down auxiliary charging switch 182 when LED indicator 183 indicates that charging is not allowed (by keeping its off state, for example) even after plug 220 is inserted to port 181, for example. When auxiliary charging switch 182 is pressed down, auxiliary charging switch 182 is turned on as described above, and switches SW1, SW2, and SW4 are turned on whereas switch SW3 is turned off. Specifically, in charging cable 200, when switch SW1 is turned on, control pilot circuit 20 detects that the voltage of control pulse signal at P1 section is 6 V, and turns on switch SW5. In this manner, the power from external power source 300 is supplied to in-vehicle charging apparatus 100 through charging cable 200. Then, the power is supplied to AC/DC 11 charging controller ECU10 when switches SW2 and SW4 are turned on and switch SW3 is turned off. Then, charging controller ECU10 operates, and charging of high voltage battery 16 is allowed to be started. The charging executed by pressing auxiliary charging switch 182 is referred to as "auxiliary charging mode." The charging which can be executed without the pressing of auxiliary charging switch 182 is referred to as "normal charging mode."

When plug 220 is required to be pulled out from port 181, the user presses down unlock button 221. Then, plug 220 and port 181 are unlocked, and plug 220 is allowed to be pulled out from port 181.

Switch-off button 222 is interlocked with unlock button 221. That is, when unlock button 221 is pressed down, switch-off button 222 turns off auxiliary charging switch 182. In this manner, when the user presses down unlock button 221, auxiliary charging switch 182 is turned off along with the unlocking, and supply of electricity from charging cable 200 to in-vehicle charging apparatus 100 is stopped. Thus, safety of the user can be ensured.

While, in the above description, auxiliary charging switch 182 is turned off by switch-off button 222 when unlock button 221 is pressed down, auxiliary charging switch 182 can be turned off in other ways. For example, when the user inserts plug 220 to port 181, auxiliary charging switch 182 is turned off by switch-off button 222. In addition, for example, when the mode is transferred from the auxiliary charging mode to the normal charging mode, auxiliary charging switch 182 is turned off under the control of charging controller ECU10 (see the flowcharts described later).

<Operation of In-Vehicle Charging Apparatus 100>

Figure 4:
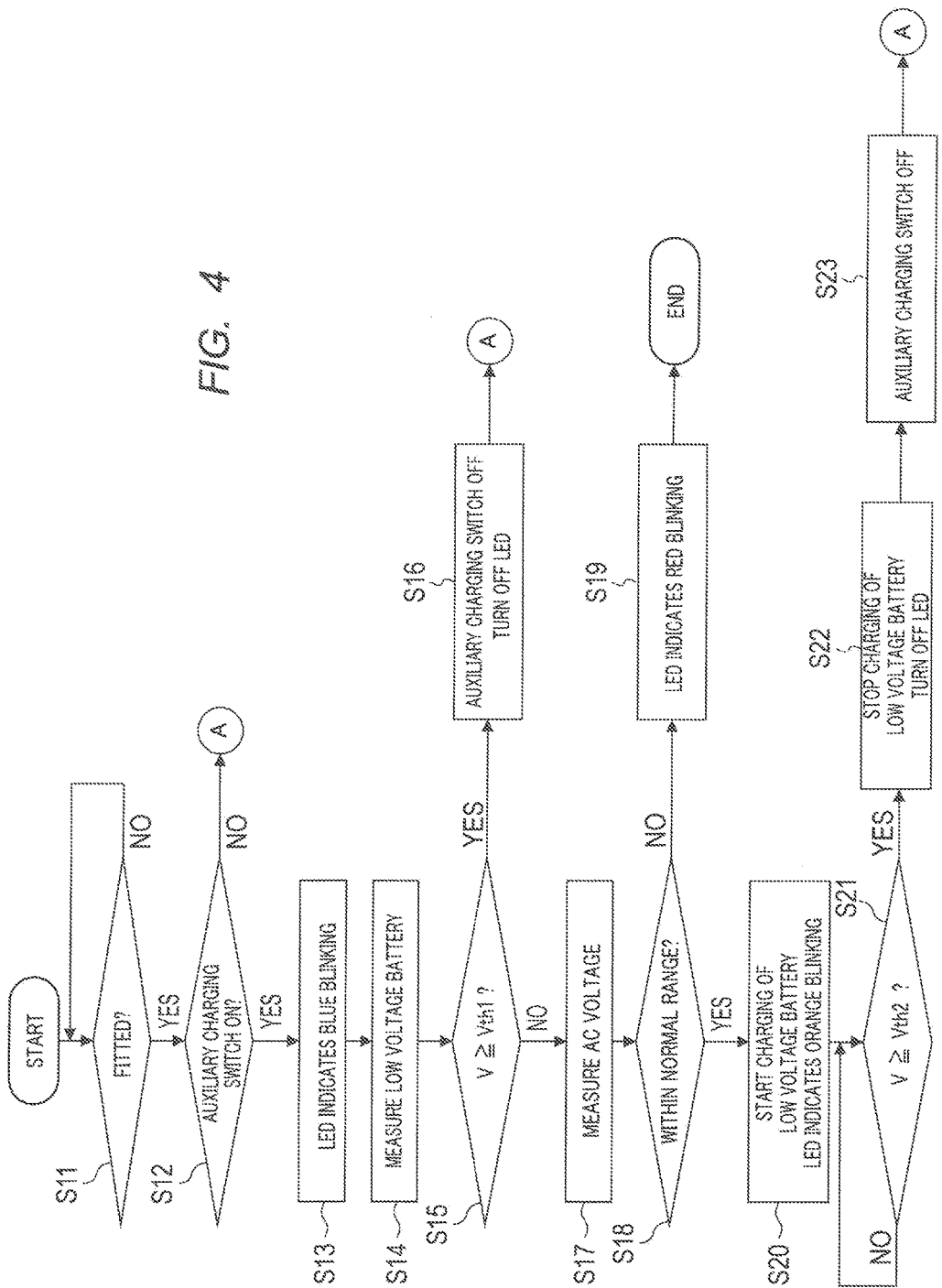
FIG. 4 is a flowchart of an exemplary operation of the in-vehicle charging apparatus according to the embodiment of the present invention.
Figure 5:
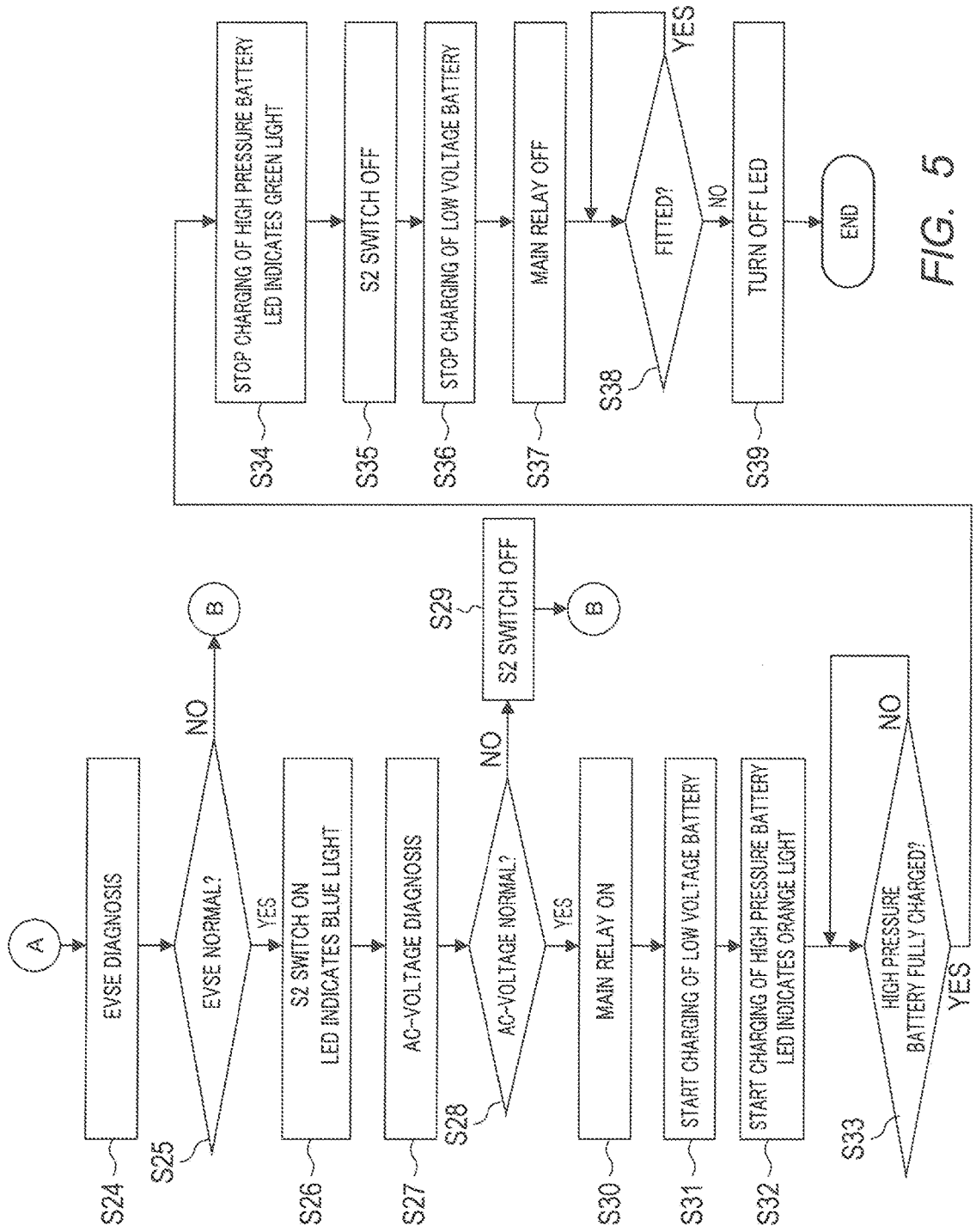
FIG. 5 is a flowchart of an exemplary operation of the in-vehicle charging apparatus according to the embodiment of the present invention.
Figure 6:
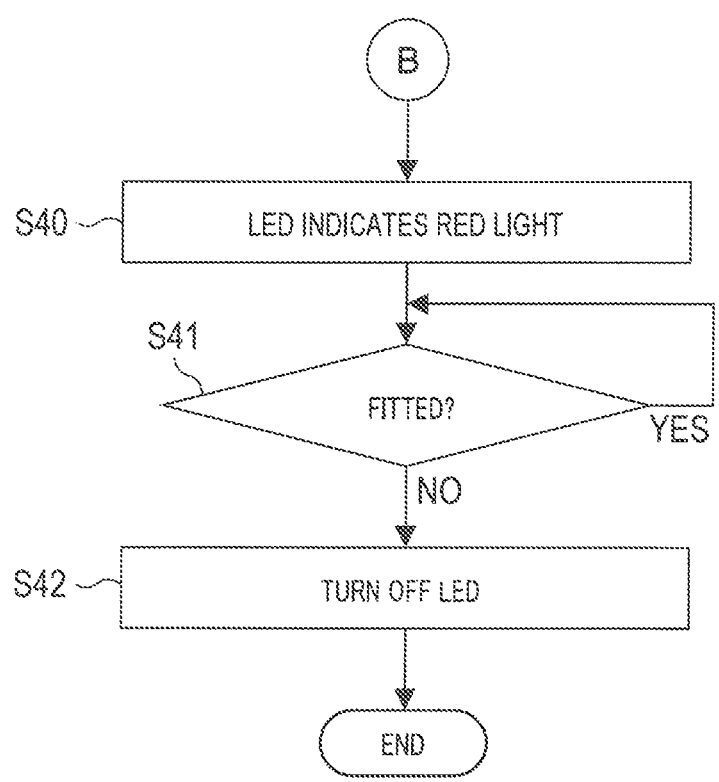
FIG. 6 is a flowchart of an exemplary operation of the in-vehicle charging apparatus according to the embodiment of the present invention.

Next, operations of in-vehicle charging apparatus 100 of the present embodiment are described with reference to FIGS. 4, 5, and 6 in this order. FIGS. 4 to 6 are flowcharts of exemplary operations of in-vehicle charging apparatus 100 of the present embodiment. Each step of the flowcharts of FIGS. 4 to 6 is performed by charging controller ECU10.

First, the flowchart of FIG. 4 is described. FIG. 4 shows an operation of the auxiliary charging mode.

At step S11, charging controller ECU10 determines whether connecting part 18 is fitted with connecting part 22. When connecting part 18 is not fitted with connecting part 22 (step S11: NO), the process is returned to step S11. On the other hand, when connecting part 18 is fitted with connecting part 22 (step S11: YES), the process is advanced to step S12.

At step S12, charging controller ECU10 determines whether auxiliary charging switch 182 has been pressed down and brought into an on state. When auxiliary charging switch 182 is in an off state (step S12: NO), the process is advanced to the operation of the normal charging mode of FIG. 5. On the other hand, when auxiliary charging switch 182 is in an on state (step S12: YES), the process is advanced to step S13.

At step S13, charging controller ECU10 controls LED indicator 183 to indicate blue blinking. The blue blinking means that the mode is the auxiliary charging mode and that charging of low voltage battery 16 is not yet started.

At step S14, charging controller ECU10 measures the voltage of low voltage battery 16.

At step S15, charging controller ECU10 determines whether the measured voltage V is not smaller than threshold Vth1. Threshold Vth1 is the smallest voltage value (for example, 9 V) that can start charging. When voltage V is not smaller than threshold Vth1 (step S15: YES), the process is advanced to step S16. When voltage V is smaller than threshold Vth1 (step S15: NO), the process is advanced to step S17.

At step S16, charging controller ECU10 turns off auxiliary charging switch 182, and controls LED indicator 183 to turn off its light. When auxiliary charging switch 182 is turned off, switches SW1, SW2 and SW4 are turned off, and switch SW3 is turned on as described above. In addition, the off state of LED indicator 183 means that charging is not allowed (the same shall apply hereinafter). After step S16, the process is advanced to the operation of the normal charging mode of FIG. 5.

At step S17, charging controller ECU10 measures an AC voltage.

At step S18, charging controller ECU10 determines whether the measured AC voltage falls within a normal range. The normal range used herein is, for example, 80 V to 270 V. When the AC voltage falls outside the normal range (step S18: NO), the process is advanced to step S19. When the AC voltage falls within the normal range (step S18: YES), the process is advanced to step S20.

At step S19, charging controller ECU10 controls LED indicator 183 to indicate red blinking. The red blinking means that the mode is the auxiliary charging mode and that the charging is in an unsafe state. Then, charging controller ECU10 terminates the charging. In this manner, the process is terminated.

At step S20, charging controller ECU10 starts charging of low voltage battery 16, and controls LED indicator 183 to indicate orange blinking. The orange blinking means that the mode is the auxiliary charging mode, and low voltage battery 16 is being charged. In addition, the charging of low voltage battery 16 in this case is performed as follows. First, charging controller ECU10 controls and brings main relay 13 into an off state, and controls high pressure charger 12 and DC/DC 15 as follows. Specifically, the high pressure charger outputs a DC power which has been converted to a high pressure DC to power DC/DC 15, and DC/DC 15 converts the voltage of the high pressure DC power into 12 V and outputs the DC power to low voltage battery 16. In this manner, charging of low voltage battery 16 is executed.

At step S21, charging controller ECU10 determines whether the measured voltage V is not smaller than threshold Vth2. Threshold Vth2 is the lower limit value (for example, 12 V) of the normal voltage of low voltage battery 16. When voltage V is smaller than threshold Vth2 (step S21: NO), the process is returned to step S21. When voltage V is not smaller than threshold Vth2 (step S21: YES), the process is advanced to step S22.

At step S22, charging controller ECU10 controls high pressure charger 12 and DC/DC 15 to stop charging of low voltage battery 16, and controls LED indicator 183 to turn off its light.

At step S23, charging controller ECU10 turns off auxiliary charging switch 182. In this manner, as described above, switches SW1, SW2, and SW4 are turned off, and switch SW3 is turned on. After step S23, the process is advanced to the operation of the normal charging mode of FIG. 5.

Next, the flowchart of FIG. 5 is described. FIG. 5 shows an operation of the normal charging mode.

At step S24, charging controller ECU10 performs EVSE diagnosis. The EVSE diagnosis is a process for determining whether the EVSE is in a normal state.

At step S25, charging controller ECU10 determines whether the EVSE is in a normal state. When a control pulse signal is found, and the AC voltage is smaller than a predetermined value (for example, 60 V), the charging controller ECU10 determines that the EVSE is in a normal state (step S25: YES). Thereafter, the process is advanced to step S26. When no control pulse signal is found in ten seconds or longer, or, when the AC voltage is equal to or greater than a predetermined value for one second or longer (for example, 60 V), charging controller ECU10 determines that the EVSE is in an abnormal state (step S25: NO). Thereafter, the process is advanced to the process of FIG. 6.

At step S26, charging controller ECU10 turns on S2 switch. In this manner, the voltage of the control pulse signal at P1 section from control pilot circuit 20 is changed from 9 V to 6 V. At this time, charging controller ECU10 controls LED indicator 183 to indicate blue light. The blue light means that the mode is the normal charging mode and that charging of high voltage battery 14 is not yet started.

At step S27, charging controller ECU10 performs AC-voltage diagnosis. The AC-voltage diagnosis is a process for determining whether the measured AC voltage is normal.

At step S28, charging controller ECU10 determines whether the AC voltage is normal. When the AC voltage falls within a predetermined range (for example, 80 V to 270 V) within five seconds from turning on of S2 switch, charging controller ECU10 determines that the AC voltage is normal (step S28: YES). Then, the process is advanced to step S30. When the AC voltage is smaller than the predetermined value even after five seconds has elapsed from turning on of S2 switch, or, when the AC voltage is found but the voltage is greater than the normal range, charging controller ECU10 determines that the AC voltage is abnormal (step S28: NO). In this case, the process is advanced to step S29.

At step S29, charging controller ECU10 turns off S2 switch. Thereafter, the process is advanced to the flowchart of FIG. 6.

At step S30, charging controller ECU10 turns on main relay 13. Thus, a state where both charging of high voltage battery 14 and charging of low voltage battery 16 can be performed is established.

At step S31, charging controller ECU10 controls DC/DC 15 to start charging of low voltage battery 16.

At step S32, charging controller ECU10 controls high pressure charger 12 to start charging of high voltage battery 14, and controls LED indicator 183 to indicate orange light. The orange light means that the mode is the normal charging mode, and high voltage battery 14 is being charged.

At step S33, charging controller ECU10 determines whether high voltage battery 14 has been fully charged. When high voltage battery 14 has not been fully charged (step S33: NO), the process is returned to step S33. When high voltage battery 14 has been fully charged (step S33: YES), the process is advanced to step S34.

At step S34, charging controller ECU10 controls high pressure charger 12 to stop charging of high voltage battery 14, and controls LED indicator 183 to indicate green light. The green light means that the mode is the normal charging mode and that charging of high voltage battery 14 has been completed.

At step S35, charging controller ECU10 turns off S2 switch.

At step S36, charging controller ECU10 controls DC/DC 15 to stop the charging of low voltage battery 16.

At step S37, charging controller ECU10 turns off main relay 13.

At step S38, charging controller ECU10 determines whether connecting part 18 and connecting part 22 are fitted with each other. When connecting part 18 and connecting part 22 are fitted with each other (step S38: YES), the process is returned to step S38. When connecting part 18 and connecting part 22 are not fitted with each other (step S38: NO), the process is advanced to step S39.

At step S39, charging controller ECU10 controls LED indicator 183 to turn off its light. Then, the process is terminated.

Next, the flowchart of FIG. 6 is described. FIG. 6 shows an operation of abnormality detection in the normal charging mode.

At step S40, charging controller ECU10 controls LED indicator 183 to indicate red light. The red light means that the mode is the normal charging mode and that the charging is in an unsafe state.

At step S41, charging controller ECU10 determines whether connecting part 18 and connecting part 22 are fitted with each other. When connecting part 18 and connecting part 22 are fitted with each other (step S41: YES), the process is returned to step S41. When connecting part 18 and connecting part 22 are not fitted with each other (step S41: NO), the process is advanced to step S42.

At step S42, charging controller ECU10 controls LED indicator 183 to turn off its light. Then, the process is terminated.

As described above, in-vehicle charging apparatus 100 of the present embodiment has a configuration in which when it is detected that the voltage of a control pulse signal preliminarily sent to in-vehicle charging apparatus 100 is a predetermined value (6 V), charging of high voltage battery 14 and low voltage battery 16 is performed with use of charging cable 200 that starts supply of power to in-vehicle charging apparatus 100. In addition, in-vehicle charging apparatus 100 includes switch SW1 (an example of a first switch) whose on/off is controlled by a component other than charging controller ECU10 (an example of a charging control section) and operates as substitute for S2 switch (an example of a voltage drop switch). With this configuration, even when the remaining capacity of low voltage battery 16 is insufficient and the operation of charging controller ECU10 is stopped, in-vehicle charging apparatus 100 can reduce the voltage at control pulse signal P1 with turning on of switch SW1. Thus, charging cable 200 can start supply of power to in-vehicle charging apparatus 100. As a result, the operation of charging controller ECU10 can be restarted, and charging of low voltage battery 16 and high voltage battery 14 can be performed.

Hereinabove, the embodiment of the present invention has been described, but the above-mentioned description is merely an example, and various modifications may be made.

For example, while the power from AC/DC 11 is supplied to charging controller ECU10 in the above-described embodiment, the power from AC/DC 11 may be supplied to low voltage battery 16. Then, the charging controller ECU10 restarts its operation as usual with the power supplied from low voltage battery 16. As described above, however, it is preferable that the power from AC/DC 11 be supplied to charging controller ECU10. One reason for this is that the power supplied to charging controller ECU10 is allowed to be lower than the power supplied to pressure battery 16, and therefore small-sized and inexpensive AC/DC 11 may be employed.

The disclosure of the specification, drawings, and abstract in Japanese Patent Application No. 2013-059795 filed on Mar. 22, 2013 is incorporated herein by reference in its entirety.

INDUSTRIAL APPLICABILITY

The present invention may be applied to an in-vehicle charging apparatus that charges two batteries mounted in a vehicle with use of an external power source through a charging cable.

REFERENCE SIGNS LIST

10 Charging controller ECU
11 AC/DC
12 High pressure charger
13 Main relay
14 High voltage battery
15 DC/DC
16 Low voltage battery
17 Backup capacitor
18, 21, 22, 30 Connecting part
20 Control pilot circuit
31 Power system
100 In-vehicle charging apparatus
180 Cap
181 Port
182 Auxiliary charging switch
183 LED indicator
200 Charging cable
220 Plug
221 Unlock button
222 Switch-off button
300 External power source

The invention claimed is:

1. An in-vehicle charging apparatus that charges a high voltage battery and a low voltage battery with use of a charging cable configured to start supply of power to the in-vehicle charging apparatus based on a state of a voltage of a pulse signal preliminarily sent to the in-vehicle charging apparatus, the in-vehicle charging apparatus comprising:

a charging control section that operates with power supplied from the low voltage battery, and controls the charging;

a voltage drop switch whose on/off is controlled by the charging control section, the voltage drop switch being configured to reduce the voltage of the pulse signal sent by the charging cable when the voltage drop switch is in an on state; and a first switch that is turned on by a physical auxiliary charging switch and reduces the voltage of the pulse signal sent by the charging cable when the first switch is in an on state, wherein the power from the charging cable is supplied to the low voltage battery or the charging control section when the first switch is turned on.

2. The in-vehicle charging apparatus according to claim 1 further comprising:

an AC/DC conversion section that converts the power from the charging cable from AC to DC; and a second switch that is turned on by the physical auxiliary charging switch to allow the power from the charging cable to be supplied to the AC/DC conversion section, wherein, when the first switch is turned on, the second switch is turned on to allow the power from the charging cable to be supplied to the AC/DC conversion section, and the AC/DC conversion section converts the power from the charging cable from AC to DC and supplies the power to the charging control section.

3. The in-vehicle charging apparatus according to claim 1 further comprising:

an AC/DC conversion section that converts the power from the charging cable from AC to DC; and a second switch that is turned on by the physical auxiliary charging switch to allow the power from the charging cable to be supplied to the AC/DC conversion section, wherein, when the first switch is turned on, the second switch is turned on to allow the power from the charging cable to be supplied to the AC/DC conversion section, and the AC/DC conversion section converts the power from the charging cable from AC to DC and supplies the power to the low voltage battery that serves as a power source of the charging control section.

4. The in-vehicle charging apparatus according to claim 2 further comprising a third switch that is turned on by the physical auxiliary charging switch to prevent the power from the AC/DC conversion section from being supplied to the low voltage battery, wherein, when the first switch and the second switch are turned on, the third switch is turned off to prevent the power from the AC/DC conversion section from being supplied to the low voltage battery.

5. The in-vehicle charging apparatus according to claim 4, wherein the physical auxiliary charging switch is configured to turn on the first switch and the second switch and turn off the third switch at a same time.

6. The in-vehicle charging apparatus according to claim 1, wherein the charging cable is configured to start supply of power to the in-vehicle charging apparatus when it is detected that the voltage of the pulse signal is a predetermined value.

7. The in-vehicle charging apparatus according to claim 2, wherein the second switch is a switch for turning on or off a power supply line between a connecting part of the in-vehicle charging apparatus and the AC/DC conversion section, the connecting part being fitted to a connecting part of the charging cable.

8. The in-vehicle charging apparatus according to claim 4, wherein the third switch is a switch for turning on or off a power supply line between the low voltage battery and the charging control section.

* * * * *